Aug. 14, 1956
R. R. BRIGHTWELL
2,758,517
METHOD AND APPARATUS FOR APPLYING
TEAR TAPES TO CELLOPHANE WRAPPERS
Filed July 22, 1955
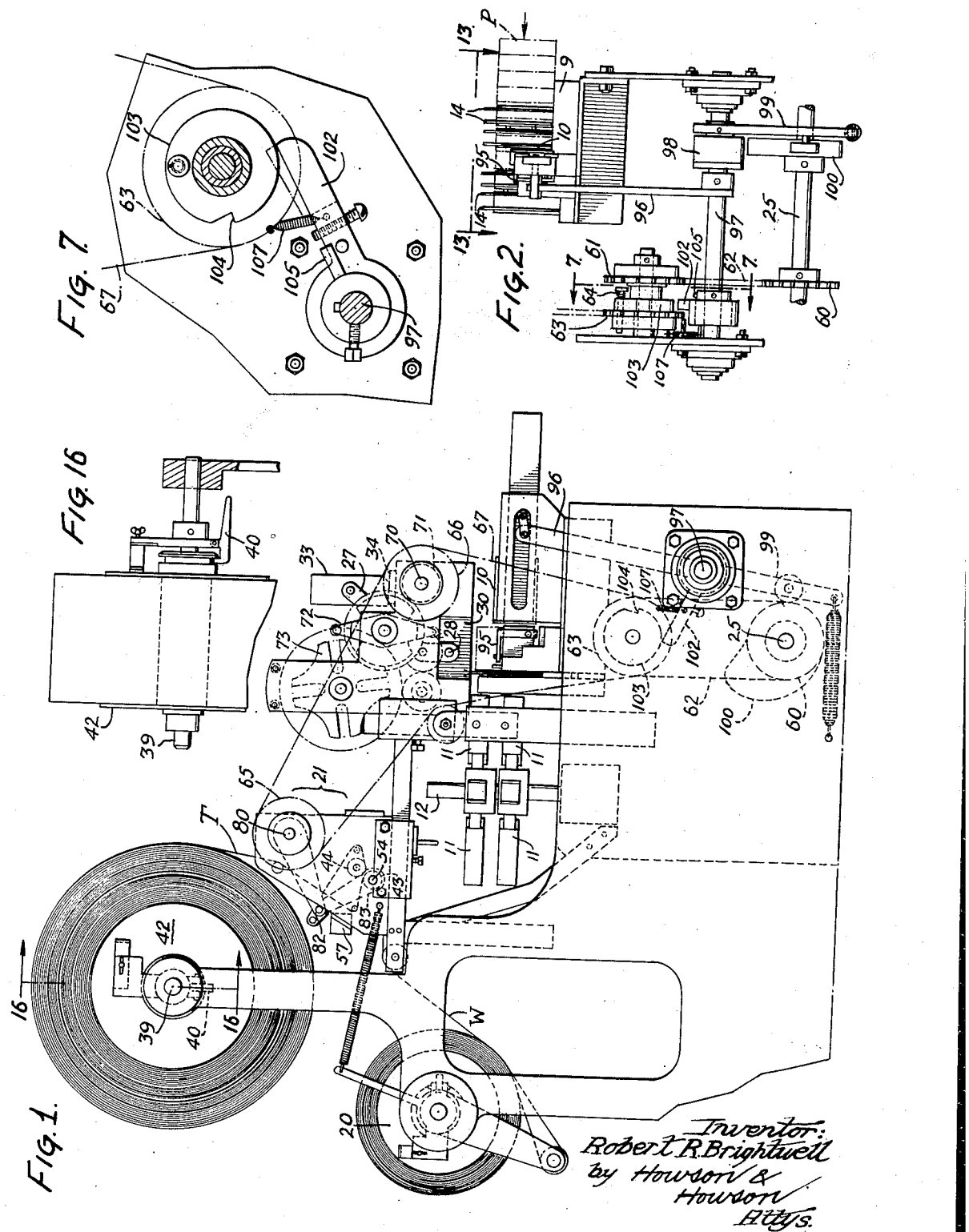
Inventor:
Robert R. Brightwell
by Howson & Howson
Attys.

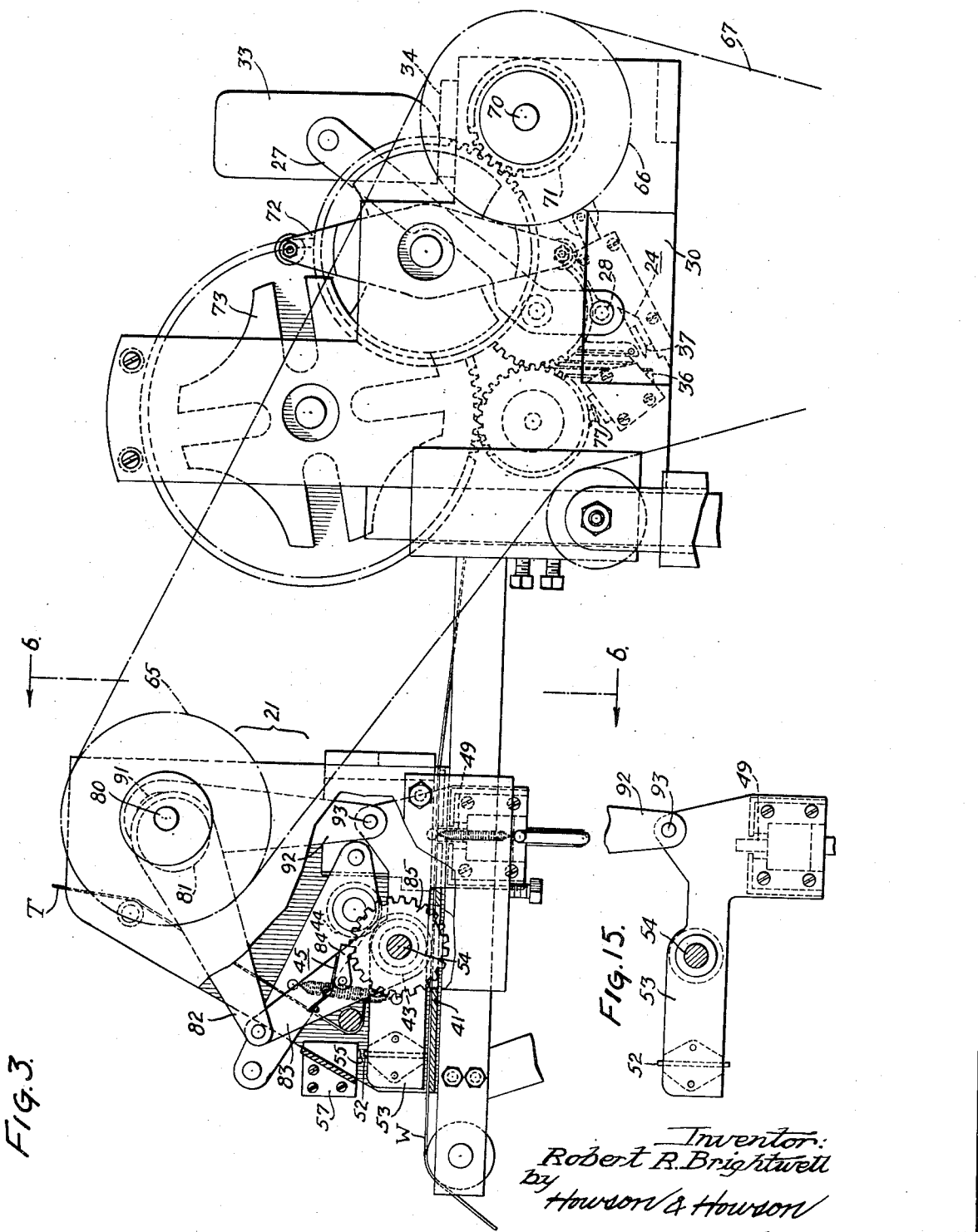

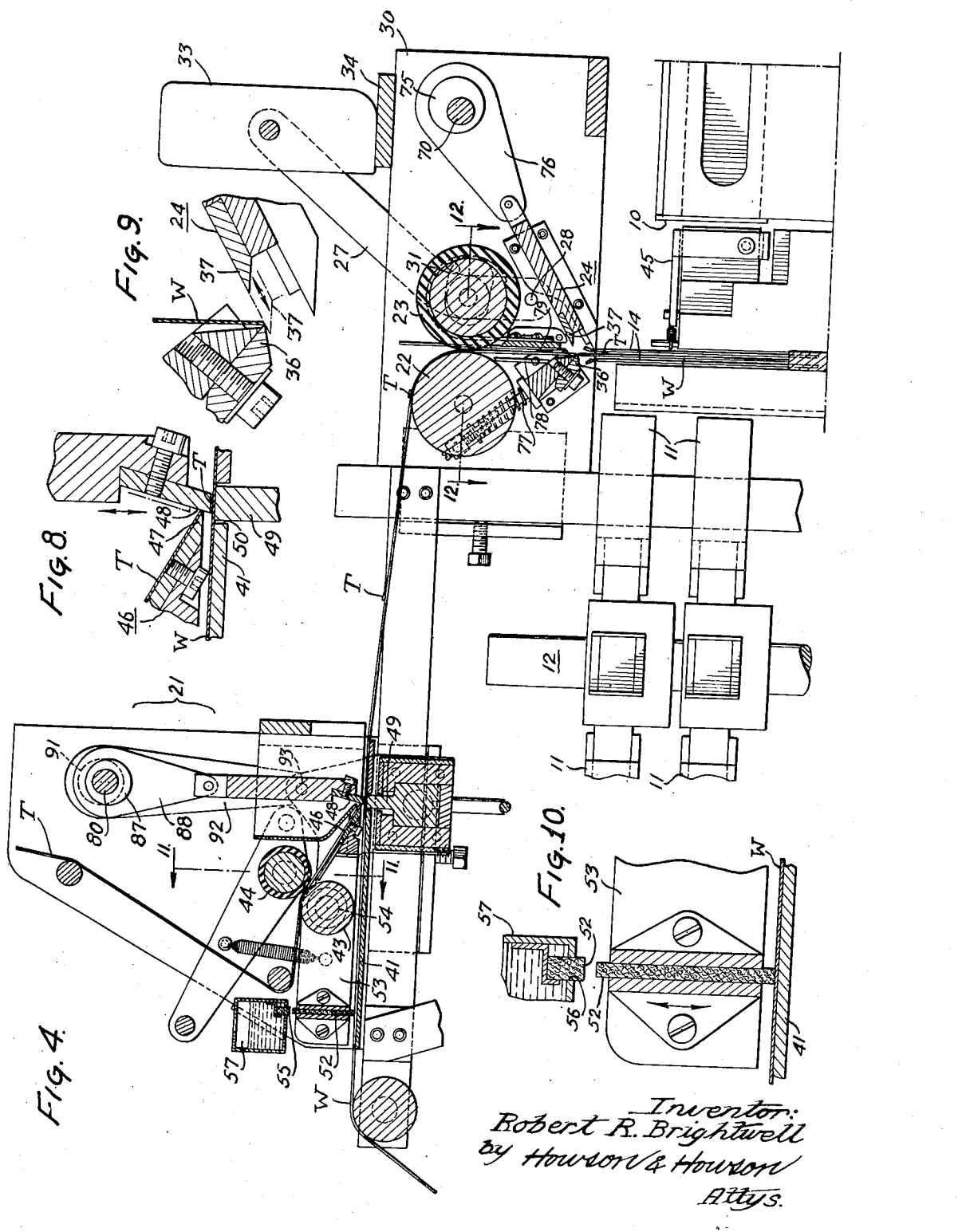

Aug. 14, 1956

R. R. BRIGHTWELL 2,758,517

METHOD AND APPARATUS FOR APPLYING
TEAR TAPES TO CELLOPHANE WRAPPERS

Filed July 22, 1955

Inventor:
Robert R. Brightwell
By Howson & Howson
Attys.

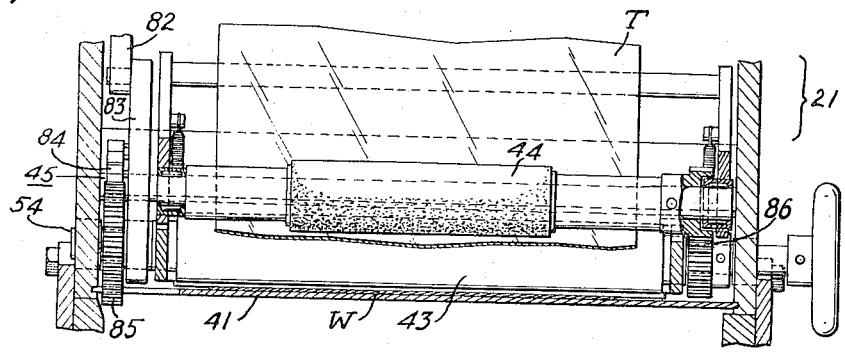
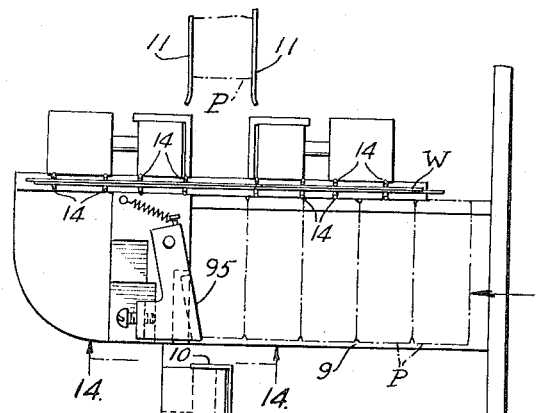
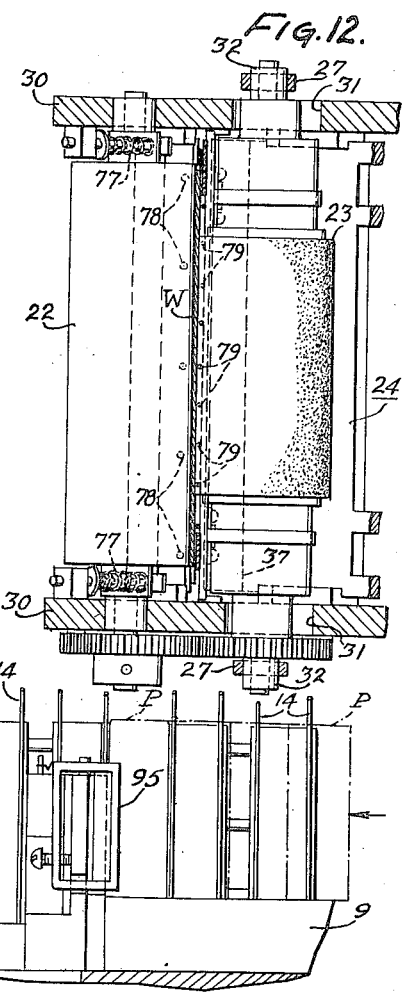

Aug. 14, 1956  R. R. BRIGHTWELL  2,758,517
METHOD AND APPARATUS FOR APPLYING
TEAR TAPES TO CELLOPHANE WRAPPERS
Filed July 22, 1955  6 Sheets-Sheet 6
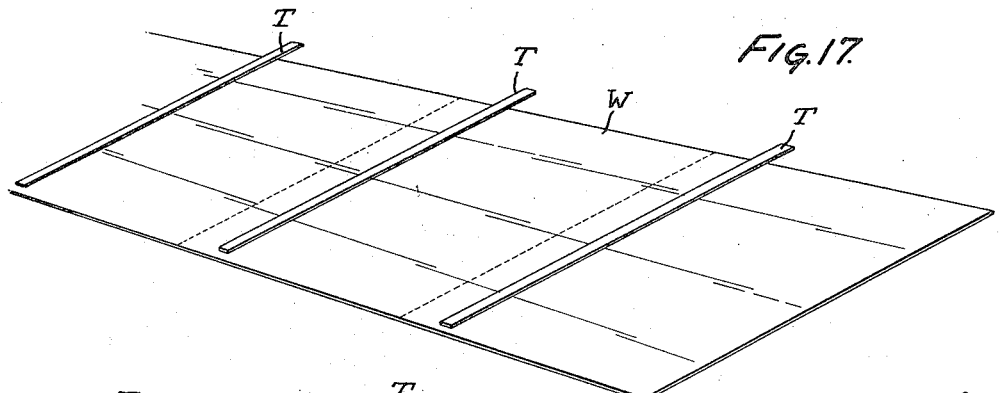
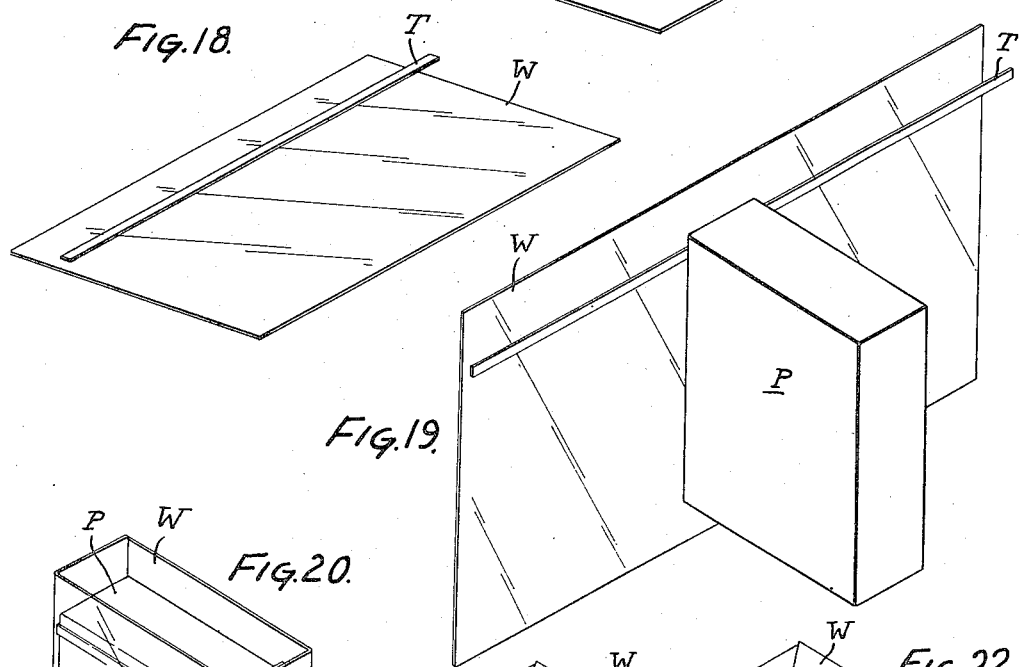
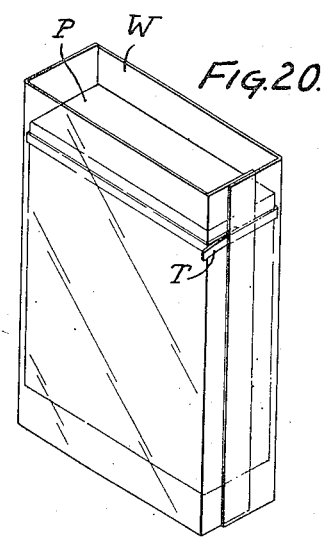
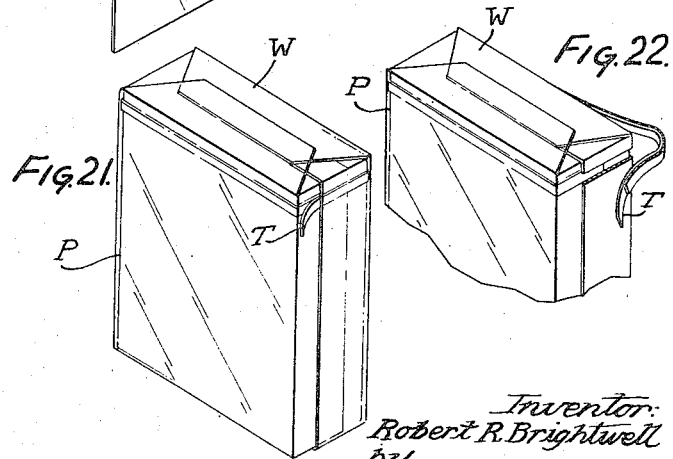
Inventor:
Robert R. Brightwell
by Howson & Howson
Attys.

United States Patent Office 2,758,517
Patented Aug. 14, 1956

2,758,517

METHOD AND APPARATUS FOR APPLYING TEAR TAPES TO CELLOPHANE WRAPPERS

Robert R. Brightwell, Philadelphia, Pa., assignor to Stephano Brothers, Philadelphia, Pa., a corporation of Pennsylvania Application July 22, 1955, Serial No. 523,681

12 Claims. (Cl. 93—1)

The present invention relates to cigarette wrapping machines, and more particularly to a method and apparatus for applying tear tapes to the wrapper prior to the enveloping of the cigarette package with the wrapper. This application is a continuation-in-part of my co-pending application, Serial No. 116,821 filed September 20, 1949, now abandoned.

A major problem in the construction of cigarette package wrapping machinery resides in the mechanism for applying the well known tear tape or strip by which the cellophane outer wrapper is quickly removed. Since it is desirable in the process of applying the cellophane wrapper to the cigarette package to apply the tear tape to the film of uncut wrapping material, it becomes obvious that the problem of registering and supplying the tear tape to the web of wrapping is critical.

Heretofore, the tear tape ribbon has been supplied in rolls of the same width used when the tear tape is ultimately applied to the package. This width is ordinarily about 1/16". In order to apply the tear tape transversely to the cellophane film when it has previously been cut to a width of about 1/16", it is necessary to feed the tear tape across the film, to provide means for properly registering the tear tape with the film, and then severing the tape and gluing it to the film. Heretofore, no entirely satisfactory apparatus for applying the tear tape to the film has been devised, although narrow tear tapes have been applied to packages of this sort. All of the devices heretofore used have many inherent objections, for example they are expensive, are frequently out of order, and are difficult to service.

The greatest difficulty in the prior art method arises from the use of tear tape ribbon, supplies of which consist of rolls approximately 1/16" wide. The ribbon is very fragile, and is difficult to thread through the guide means directing the ribbon onto the cellophane film. In addition, either the ribbon or the film is coated with an adhesive for solvents, and after prolonged periods of operation, the temperature of the operating parts of the guide and the associated structure rises sufficiently to activate the adhesive and cause sticking. To remedy this problem, the prior art machines provide means for applying the solvent to the ribbon just prior to its application to the cellulose film, but after the machine is shut down, it is necessary for the ribbon to be dislodged from the guide means upon starting up.

With the foregoing in mind, a primary object of the present invention is to provide an improved method and apparatus for applying tear tapes to cellophane wrappers for cigarette packaging machines.

More specifically, the present invention contemplates means for forming narrow ribbons from wide bands of tear tape stock, and simultaneously applying the narrow ribbon to the cellophane film in proper registry with narrow bands of solvent or other adhesive material previously applied to the film.

Another object of the present invention is to provide apparatus of simple construction which is fully effective in operation and use.

These and other objects of the present invention and the various features and details of the construction and operation thereof are more fully set forth hereinafter with reference to the accompanying drawings in which:

Fig. 1 is a side elevational view of an apparatus made in accordance with the present invention;

Fig. 2 is an end elevational view as seen from the right in Fig. 1;

Fig. 3 is an enlarged side elevational view with the side plates removed, showing the driving connections for the apparatus shown in Fig. 1;

Fig. 4 is a longitudinal sectional view similar to Fig. 3 showing the operating parts of the apparatus;

Fig. 7 is an enlarged detail sectional view taken on the line 7—7 of Fig. 2;

Fig. 8 is an enlarged detail sectional view of the tear tape severing and applying mechanism;

Fig. 9 is an enlarged fragmentary sectional view of the cellophane web-cutting mechanism;

Fig. 10 is an enlarged fragmentary sectional view of the solvent applying mechanism shown in Fig. 4;

Fig. 11 is a transverse sectional view taken on the line 11—11 of Fig. 4;

Fig. 12 is a horizontal sectional view taken on the line 12—12 of Fig. 4;

Fig. 13 is a horizontal sectional view taken on the line 13—13 of Fig. 2;

Fig. 14 is a sectional view taken on the line 14—14 of Fig. 13;

Fig. 15 is a fragmentary detached elevational view of the rocker arm mounting the solvent-applying means and the heater element;

Fig. 16 is a sectional view taken on the line 16—16 of Fig. 1;

Fig. 17 is a perspective view of the cellophane web with the tear strips applied thereto;

Fig. 18 is a perspective view of the web severed for application to the cigarette carton;

Fig. 19 is a perspective view showing the first step in the application of the wrapper to the cigarette carton;

Fig. 20 is a view of an intermediate step in the application of the wrapper to the carton;

Fig. 21 is a perspective view of the wrapped cigarette carton; and,

Fig. 22 is a fragmentary perspective view showing the operation of the tear strips in removing the wrapping.

Figure 6:
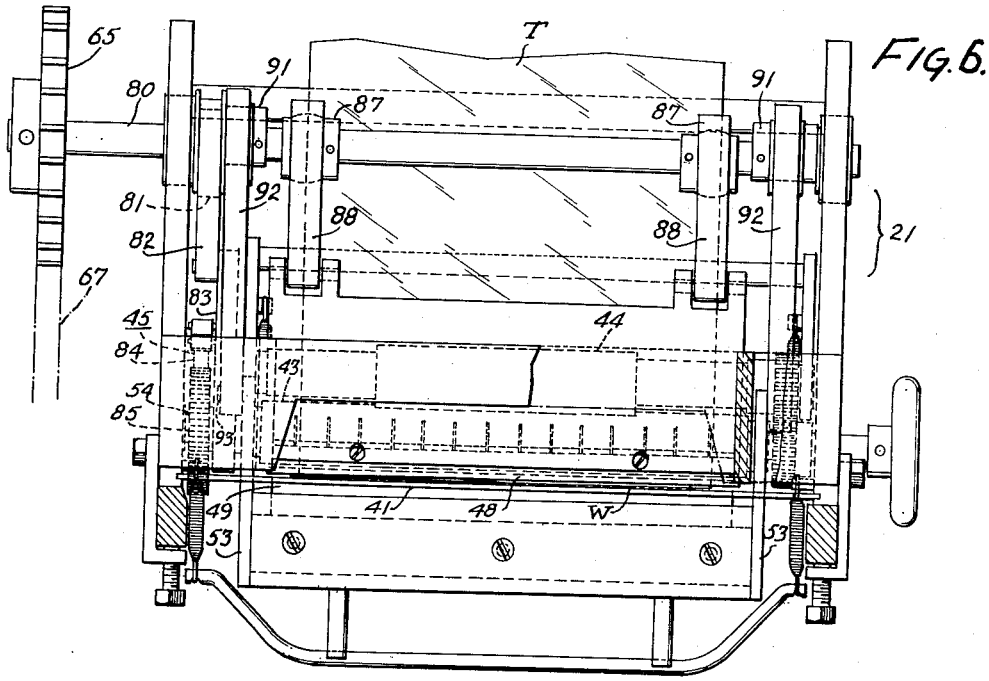
Fig. 6 is a sectional view taken on the line 6—6 of Fig. 3.

The apparatus of the present invention is applicable to any standard cigarette package wrapping machine, but it is particularly applicable to the wrapping machine disclosed in my co-pending application, Serial No. 445,610 filed July 26, 1954, now Patent No. 2,720,738. In this machine (see Figs. 1, 2, 4 and 13), packages P are advanced to the machine in a line, for example on a feed table 9 as shown in Figs. 2 and 13. A repicrocating plunger 10 engages the leading package P and advances it between the arms 11, 11 of a rotary conveyor 12. Intermediate the feed table 9 and the conveyor 12, are a plurality of guides 14 for the wrapper material W. The package P as it passes from the feed table 9 to a position between the arms 11, 11 picks up a sheet of the wrapper W and wraps it about three sides thereof. The conveyor rotates about its vertical axis and first overlaps the wrapper W on the fourth side, for example as shown in Fig. 20, and there in succeeding operations, folds the top and bottom projecting portions of the wrapper W over upon themselves, as shown in Fig. 21, and finally seals them in place. The packages P are then discharged from the machine ready for packing in a carton or the like. The wrapper W is provided with a tear tape T which projects beyond one side of the wrapper, and which facilitates opening of the package, for example as shown in Fig. 22. The present invention provides means for supplying the wrapping material W with the tear tape T applied to the position intermediate the guides 14, 14 of the packaging machine.

In accordance with the invention, the wrapping material W, as shown in Fig. 1, is supplied from a roll 20 and is advanced across the bed of a tear tape applying mechanism 21 which applies strips of the tear tape material T to the web W. From the tear tape applying mechanism 21, the web with the tear tape T applied thereto, is advanced by a pair of feed rollers 22, 23 through a severing means 24 to a position intermediate the guides 14, 14 of the packaging machine. The feed rollers and severing means are driven in synchronism with the tear tape applying mechanism from the main drive shaft 25 of the package wrapping machine (see Fig. 1).

Figure 5:
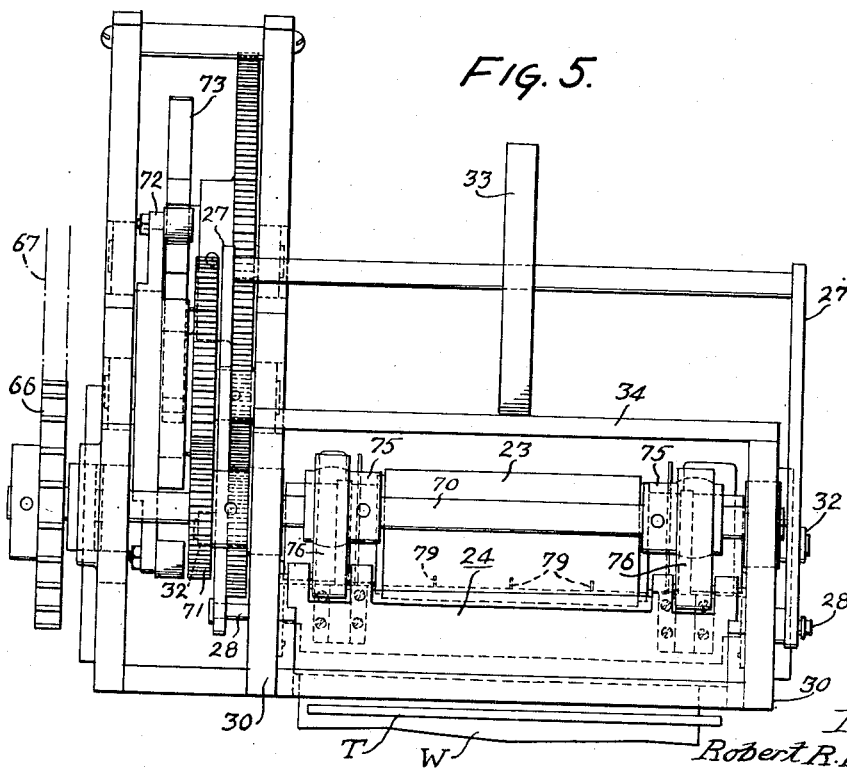
Fig. 5 is a right hand end elevational view of the apparatus shown in Fig. 3.

The feed rolls 22 and 23 operate intermittently to draw preselected lengths of the web W from the supply roll 20. The feed roll 22 is positively driven in timed relation to the tear tape applying mechanism 21, as more fully described hereinafter, and the roll 23 is biased against the roll 22, for example as shown in Fig. 4. To this end, the roll 23 is journalled on a pair of arms 27, 27 which are pivoted to the frame as indicated at 28. As shown in Fig. 12, the frame consists of a pair of spaced end plates 30, 30, which have elongated apertures 31 therein for receiving the terminal portions of the roll 23, the roll being mounted for free rotation on the levers 27, 27 as indicated at 32, 32. The roll 23 is biased against the roll 22 by a latching cam 33 mounted on the free extremities of the levers 27, 27 and engageable against a cross piece 34 of the frame (see Fig. 5).

The severing mechanism 24 is actuated, as more fully set forth hereinafter, during the lulls in the intermittent movement of the feed rolls 22 and 23. The severing mechanism comprises a stationary blade 36 and a guillotine 37 which cooperates with the stationary blade 36 to sever the preselected lengths of wrapping material which are advanced between the guide members 14, 14 of the wrapping machine by the feed rolls 22 and 23.

The tape applying mechanism 21 comprises a bed plate 41 across which the web W is advanced by the feed rollers 22 and 23. The tear tape material T is supplied from a supply roll 42 and is advanced by feed rolls 43 and 44, the roll 43 being positively driven by a ratchet mechanism 45 during an interval within the time when the feed rolls 22 and 23 are advancing the web. The supply roll 42 is freely rotatable on a shaft 39 and is held against lateral displacement by a latch 40 which affords quick and easy replacement of the roll 42 when it is exhausted. The tape feed rolls 43 and 44 advance the tape material T over a face bar 46 having a sharpened leading edge 47 which serves as a stationary blade for severing the short length of tear tape. During the lull in the feed of the web W, a movable blade 48 is displaced downwardly and pivotally, as more fully set forth hereinafter to shear a short length of tear tape material corresponding to the desired width of the tear tape ribbon. As shown in Fig. 8, the downward movement of the blade 48 carries the short length of tear tape material into contact with the web W, the lower surface of the blade 48 depositing the tear tape material flush against the web material W. Simultaneously, with the downward movement of the blade 48, a heater element 49 is displaced upwardly through an opening 50 in the bed plate 41, and causes a heat-sealed connection between the tear tape T and the web W. In order to insure proper sealing of the tear tape material to the web, a solvent is applied to the web material.

In accordance with the invention, the solvent is applied to the web material in a narrow band corresponding approximately in width to the length of the tear tape. This insures that the web material W is maintained free for passage between the feed rolls 22 and 23 without danger of adhering thereto by reason of excess solvent on the web material. The solvent is applied to the web material simultaneously with the application of heat, but at a point remote from the heat application. The distance between the point of application of heat and the point of application of solvent is precisely equal to the predetermined length of material which is advanced, so that the solvent applied during one lull in the intermittent advance of the web material W, is advanced into registry with the heating element 49 during the succeeding lull in the intermittent movement of the web material.

The solvent is applied to the web material by a wick 52 mounted on a rocker arm 53 which is pivoted for movement on a shaft 54 mounting the feed roll 43. The rocker 53 has mounted on its opposite end the heating element 49. Thus, when the heating element 49 is actuated upwardly into engagement with the underside of the web W, the wick 52 is actuated downwardly into engagement with the upper surface of the web at a point removed from the point of heat application a distance corresponding to the length of the predetermined advance of the web. After the lull, the heater is displaced downwardly away from the web, and the wick 52 is displaced upwardly. In its upper limit position, the wick 52 engages a pad 55 mounted in an aperture 56 of a solvent tank 57. The tank 57 is maintained with a supply of solvent, which keeps the pad 55 saturated. Thus, during the advance of the web W, the wick 52 receives a supply of solvent from the pad 55, but when the wick 52 is actuated into engagement with the web, during a lull in the movement thereof, the wick 52 is divorced from the supply, thereby insuring against an over-supply of solvent to the web material. Thus, the wick 52 applies a narrow band of solvent across the full width of the web material.

As shown in Fig. 6, the tear tape material T is of approximately the same width as the web W, but is offset laterally, so that at the left hand extremity of the web W, the web extends beyond the tear tape T, whereas at the right hand end, the tear tape extends beyond the web. This is clearly shown in Fig. 17. By this arrangement, when the wrapping is assembled to the package P, the free extremity of the tear tape T forms a tab for starting the tearing of the wrapper. As described more fully in my copending application above identified, during the wrapping operation, the wrapper is slit at the side of the tear tape to further facilitate removing the wrapper from the package.

As shown in Fig. 3, the drive for the web material is synchronized with the tape applying mechanism 21, both being driven by the main drive shaft 25 of the wrapping machine, shown in Fig. 1. The drive shaft 25 mounts a sprocket 60 which drives the sprocket 61 through the chain 62, the drive ratio being 1 to 1. The sprocket 61 is frictionally engaged with a sprocket 63, for example as indicated at 64. As described more fully hereinafter, stop means locks the sprocket 63 against rotation when a package P is not properly positioned on the feed table 9 of the package wrapping machine. The sprocket 63, in turn, drives both the drive sprocket 65 of the tape applying mechanism 21, and the drive sprocket 66 of the web feeding and severing means, by means of the chain 67, the drive ratio between the sprocket 63 and the sprockets 65 and 66 being 1 to 1. Thus, when the sprocket 63 is actuated a single revolution, both the tape applying mechanism and the web driving and severing means are actuated a single revolution, and when the sprocket 63 is arrested, the above mechanisms are likewise arrested simultaneously. Thus, the sprockets 65 and 66 are maintained in precise synchronism at all times.

As shown in Fig. 3, the sprocket 66 is keyed to a shaft 70 which drives a gear 71 driving the pin wheel 72 for the Geneva drive wheel 73 of the intermittent feed mechanism. The Geneva drive wheel 73, in turn, is geared to the feed roll 22, and to insure against slippage of the web between the feed rolls 22 and 23, the roll 23 is geared for rotation with the roll 22. Thus, continuous rotation of the sprocket 66 effects intermittent advance of the feed rolls 22 and 23, the Geneva driving connection insuring the advance of length of web W of the precise amount necessary to form a single wrapper. The gearing is such that a single revolution of the shaft 70 effects a quarter revolution of the Geneva wheel 73 which in turn drives the rolls 22 and 23 to feed the necessary length of web, for example, four inches.

The shaft 70 of the sprocket 66 also drives the severing mechanism. To this end, the shaft 70 mounts a pair of cranks 75, 75, which through the arms 76, 76, reciprocate the guillotine blade 37 into and out of engagement with the fixed blade 36. In order to insure proper shearing of the web W by the blades 36 and 37, one of the eccentrics 75 is advanced relative to the other to effect engagement of the blades at one end thereof prior to engagement of the blades at the other end, whereby a scissors action on the web is obtained. The stationary blade 36 is resiliently mounted, as indicated at 77 to insure proper engagement of the fixed blade 36 with the movable blade 37.

The positioning of the cranks 75, 75 on the shaft 70 is such that the blade 37 is actuated into engagement with the blade 36 during each lull in the intermittent movement of the feed rolls 22 and 23. Thus, the blades sever precisely the length of web which has been advanced by the feed rolls. To insure against buckling of the web intermediate the feed rolls 22 and 23 and the severing mechanism 24, guides 78 and 79 are positioned intermediate the feeding and severing mechanisms, as shown in Fig. 4. It should be further noted that the feed rolls spaced from the severing means are separated therefrom by a distance less than the predetermined length of web necessary to wrap the package. By this arrangement, during a single revolution of the shaft 70, the tear tape T on the web is advanced continuously from a position behind the feed rolls 22 and 23 to a position below the severing means 24. Thus, when the web is at rest during the lull in the operation of the feed rolls, the area of the web adjacent the tear tape T is out of contact with the operating mechanisms, so that the possibility of adhesion of the web or tape to the mechanism is eliminated.

The tape applying mechanism 21 is driven by the sprocket 65 by means of the shaft 80. Thus, when the shaft 70 makes one revolution, the shaft 80 also makes one revolution. A single revolution of the shaft 80 effects an advance of the tear tape material T a preselected distance corresponding to the length of the tear tape desired to be secured to the web. This is accomplished by an eccentric 81 mounted on the shaft which reciprocates an arm 82 which in turn oscillates an arm 83 which is pivoted on the shaft 54 mounting the feed roll 43. The arm 83 pivotally mounts a spring-biased pawl 84 which engages a gear 85 keyed to the shaft 54. Oscillation of the arm 83 advances the gear 85 one tooth to thereby advance the feed roll a distance to feed the desired length of tear tape material, for example, one sixteenth of an inch. It should be noted that the pawl advances the feed roll 43 during that portion of the cycle when the pins of the pin wheel 72 are becoming disengaged from the Geneva wheel 73, so that upon completion of the advance of the tear tape material T, the web W is stationary. To insure positive feeding of the tear tape material T, the feed rolls 43 and 44 are geared together, as indicated at 86 in Fig. 11.

Upon completion of the advance of the tear tape material T by the feed rolls 43 and 44, the movable blade 48 is actuated downwardly to sever the length of tear tape from the continuous sheet advanced by the rolls. To this end, a pair of cranks in the form of eccentrics 87, 87 on the shaft 80, by means of a pair of crank arms 88, 88 displace the knife 48 in a vertical path. To provide a scissors action between the knife 48 and the stationary blade 47, one of the eccentrics 87 is advanced relative to the other, so that one end of the blade 48 is displaced downwardly into engagement with the fixed blade 46 before the other end of the blade 48. As shown in Fig. 8, the bottom surface of the blade 48 is disposed horizontal to lie flush against the web W advanced across the bed 41 of the tear tape applying mechanism 21.

Simultaneous with the downward displacement of the blade 48, the rocker arm 53 is pivoted on the shaft 54 to engage the heater element 49 against the under surface of the web W. The rocker arm 53 is actuated by eccentrics 91, 91 keyed to the shaft 80, for example, as shown in Fig. 6. Crank arms 92, 92 depend from the cranks 91, 91 and are pivoted as indicated at 93 in Fig. 3 to the rocker arm 53. Thus, the arm 92 is displaced upwardly simultaneous with the downward displacement of the arm 88 so that the blade 48 forcibly engages the tear tape material T and the web W against the heater element 49. Since all of the elements of the tear tape applying mechanism 21 are driven from the common shaft 80, the elements of the mechanism are synchronized at all times.

As pointed out above, a common chain 67 drives the sprockets 65 and 66 so that when the web advancing and severing mechanism is arrested, the tear tape applying mechanism is likewise arrested. Means is provided to stop operation of these mechanisms when a package P fails to advance into registry with the pusher arm 10. To this end, a latch 95 is pivoted adjacent the terminal end of the table 9. A package advanced along the bed into registry with the pusher arm 10 displaces the latch 95 out of the path of the pusher arm 10, but when a package fails to advance into registry with the pusher arm, the latch assumes the position shown in Fig. 13 and blocks travel of the pusher 10. As shown in Figs. 1 and 2, the pusher 10 is actuated by an arm 96 keyed to a shaft 97. The arm 96 is driven by a friction clutch 98 rotatably mounted on the shaft 97 and rotated thereon by an arm 99 controlled by a cam 100 on the shaft 25. Thus, in normal operation, the shaft 97 is rocked on its axis by the clutch 98 during each rotation of the main drive shaft 25. A lock pawl 102 is rotatably mounted on the shaft 97 (see Fig. 7) and is operable to ride on the hub 103 of the sprocket 63. The hub is provided with a notch at 104 to receive the lock pawl 102 to prevent rotation of the sprocket 63 by the friction element 64 on the sprocket 61. To prevent engagement of the pawl 102 in the notch 104, a trip arm 105 is keyed to the shaft 97. When the shaft 97 is rocked on its axis in normal operation, the trip arm 105 displaces the pawl 102 outwardly from the hub 103 and permits the sprocket 61 to drive the sprocket 63 continuously. In the event that the pusher 10 is held against inward movement by the latch 95, the shaft 97 is held against rocking movement, and the lock pawl 102 is engaged in the notch 104 under the action of a spring 107. This halts operation of the web-feeding and tear tape applying mechanisms by stopping operation of the sprocket 63 which drives the chain 67.

Thus, the present invention provides apparatus for applying tear tapes to a wrapper web, advancing said web with the tear tape applied to a cigarette wrapping machine and severing preselected lengths of the web to form a suitable wrapper for the cigarette package, said mechanism being driven concurrently with the wrapping machine and having means to interrupt operation of the mechanism when the supply of packages to the wrapping machine is interrupted.

While a particular embodiment of the present invention has been herein illustrated and described, it is not intended to limit the invention to such a disclosure, but changes and modifications may be made therein and thereto within the scope of the following claims.

1. The method of supplying individual wrappers to a package wrapping machine, said wrappers having a tear tape applied thereto extending transversely of said wrapper and projecting beyond at least one side thereof, said method comprising the steps of supplying a continuous web of wrapping material and a continuous web of tear taper material, advancing said web of wrapping material through a tape applying station, intermittently advancing said continuous web of tear tape material into said station, in overlying relationship with said web of wrapping material with at least one longitudinal marginal portion of said tear tape material extending beyond the side edge of said wrapping material, severing short lengths of tear tape material, simultaneously applying each of said severed lengths of tear tape material to one side of said wrapping material and applying heat to the other side of said wrapping material to effect adhesion of said tear tape material to said wrapping material, advancing the web to a web-severing station adjacent said package wrapping machine, and severing said web along a line in spaced parallel relation to said tear tape material to form an individual wrapper.

2. The method of supplying individual wrappers to a package wrapping machine, said wrappers having a tear tape applied thereto extending transversely of said wrapper and projecting beyond at least one side thereof, said method comprising the steps of supplying a continuous web of wrapping material and a continuous web of tear tape material, intermittently advancing said web of wrapping material through a tape applying station, intermittently advancing said continuous web of tear tape material into said station in overlying relationship with said web of wrapping material with at least one longitudinal marginal portion of said tear tape material extending beyond the side edge of said wrapping material, severing short lengths of tear tape material during lulls in the intermittent movement of said wrapping material, simultaneously applying each of said severed lengths of tear tape material to one side of said wrapping material and applying heat to the other side of said wrapping material to effect adhesion of said tear tape material to said wrapping material, advancing the web to a web-severing station adjacent said package wrapping machine, and severing said web along a line in spaced parallel relation to said tear tape material to form an individual wrapper.

3. The method of supplying individual wrappers to a package wrapping machine, said wrappers having a tear tape applied thereto extending transversely of said wrapper and projecting beyond at least one side thereof, said method comprising the steps of supplying a continuous web of wrapping material and a continuous web of tear tape material, intermittently advancing said web of wrapping material through a tape applying station, intermittently advancing said continuous web of tear tape material into said station in overlying relationship with said web of wrapping material with at least one longitudinal marginal portion of said tear tape material extending beyond the side edge of said wrapping material, severing short lengths of tear tape material, simultaneously applying each of said severed lengths of tear tape material to one side of said wrapping material and applying heat to the other side of said wrapping material to effect adhesion of said tear tape material to said wrapping material, advancing the web to a web-severing station adjacent said package wrapping machine, and severing said web along a line in spaced parallel relation to said tear tape material to form an individual wrapper during lulls in the intermittent movement of said web.

4. The method of supplying individual wrappers to a package wrapping machine, said wrappers having a tear tape applied thereto extending transversely of said wrapper and projecting beyond at least one side thereof, said method comprising the steps of supplying a continuous web of wrapping material and a continuous web of tear tape material, intermittently advancing said web of wrapping material through a tape applying station, intermittently advancing said continuous web of tear tape material into said station in overlying relationship with said web of wrapping material with at least one longitudinal marginal portion of said tear tape material extending beyond the side edge of said wrapping material, severing short lengths of tear tape material during lulls in the intermittent movement of said wrapping material, simultaneously applying each of said severed lengths of tear tape material to one side of said wrapping material and applying heat to the other side of said wrapping material to effect adhesion of said tear tape material to said wrapping material, advancing the web to a web-severing station adjacent said package wrapping machine, and severing said web along a line in spaced parallel relation to said tear tape material to form an individual wrapper during lulls in the intermittent movement of said web.

5. Apparatus for supplying individual wrappers to a package wrapping machine, said wrappers having a tear tape applied thereto extending transversely of said wrapper and projecting beyond at least one side thereof; a tape-applying mechanism having a bed and a stationary knife overlying said bed, means for advancing a continuous web of wrapping material across said bed below said knife, said tape-applying mechanism including means intermittently advancing short lengths of a continuous web of tear tape material across said knife into overlying relationship with said web of wrapping material, a second knife movable between upper and lower limit positions to engage said stationary knife and sever said short lengths of tear tape material, said movable knife having a flat undersurface to engage said short lengths of tear tape material, said flat undersurface in the lower limit position of said knife disposed flush against the upper surface of said web of wrapping material to thereby engage said short lengths against said web, a heater element mounted in said bed for displacement against the undersurface of said wrapping material in registry with the undersurface of said movable knife to effect heat sealing of said short length to said web, and a severing mechanism for said web of wrapping material disposed adjacent said package wrapping machine and including a knife operable to sever said web to form individual wrappers for said machine.

6. Apparatus for supplying individual wrappers to a package wrapping machine, said wrappers having a tear tape applied thereto extending transversely of said wrapper and projecting beyond at least one side thereof; a tape-applying mechanism having a bed and a stationary knife overlying said bed, means for intermittently advancing a continuous web of wrapping material across said bed below said knife, said tape-applying mechanism including means intermittently advancing short lengths of a continuous web of tear tape material across said knife into overlying relationship with said web of wrapping material, a second knife movable between upper and lower limit positions to engage said stationary knife and sever said short lengths of tear tape material, said movable knife having a flat undersurface in the lower limit position of said knife disposed flush against the upper surface of said web of wrapping material to thereby engage said short lengths against said web, a heater element mounted in said bed for displacement against the undersurface of said wrapping material in registry with the undersurface of said movable knife to effect heat sealing of said short length to said web, timing connections between said intermittent web advancing means and said movable knife to displace the latter to its lower limit position during the lulls in the intermittent advance, and a severing mechanism for said web of wrapping material disposed adjacent said package wrapping machine and including a knife operable to sever said web to form individual wrappers for said machine.

7. Apparatus for supplying individual wrappers to a package wrapping machine, said wrappers having a tear tape applied thereto extending transversely of said wrapper and projecting beyond at least one side thereof; a tape-applying mechanism having a bed and a stationary knife overlying said bed, means for intermittently advancing a continuous web of wrapping material across said bed below said knife, said tape-applying mechanism including means intermittently advancing short lengths of a continuous web of tear tape material across said knife into overlying relationship with said web of wrapping material, a second knife movable between upper and lower limit positions to engage said stationary knife and sever said short lengths of tear tape material, said movable knife having a flat undersurface to engage said short lengths of tear tape material, said flat undersurface in the lower limit position of said knife disposed flush against the upper surface of said web of wrapping material to thereby engage said short lengths against said web, a heater element mounted in said bed for displacement against the undersurface of said wrapping material in registry with the undersurface of said movable knife to effect heat sealing of said short length to said web, timing connections between said intermittent web advancing means and said movable knife to displace the latter to its lower limit position during the lulls in the intermittent advance, and a severing mechanism for said web of wrapping material disposed adjacent said package wrapping machine and including a knife operable to sever said web to form individual wrappers for said machine, and timing connections to actuate said knife during the lulls in the intermittent advance of said web advancing means.

8. Apparatus for supplying individual wrappers to a package wrapping machine having drive, said wrappers having a tear tape applied thereto extending transversely of said wrapper and projecting beyond at least one side thereof; a tape-applying mechanism having a bed and a stationary knife overlying said bed, means for intermittently advancing a continuous web of wrapping material across said bed below said knife, said tape-applying mechanism including means intermittently advancing short lengths of a continuous web of tear tape material across said knife into overlying relationship with said web of wrapping material, a second knife movable between upper and lower limit positions to engage said stationary knife and sever said short lengths of tear tape material, said movable knife having a flat undersurface to engage said short lengths of tear tape material, said flat undersurface in the lower limit position of said knife disposed flush against the upper surface of said web of wrapping material to thereby engage said short lengths against said web, a heater element mounted in said bed for displacement against the undersurface of said wrapping material in registry with the undersurface of said movable knife to effect heat sealing of said short length to said web, timing connections between said intermittent web advancing means and said movable knife to displace the latter to its lower position during the lulls in the intermittent advance; a severing mechanism for said web of wrapping material disposed adjacent said package wrapping machine including a knife operable to sever said web to form individual wrappers for said machine, and timing connections to actuate said knife during the lulls in the intermittent advance of said web advancing means; common drive means for said tape-applying mechanism, said intermittent advancing means for said continuous web of wrapping material, and said severing mechanism; a friction clutch driving said common drive means from the drive of said package wrapping machine; and means to render said clutch inoperative upon failure of the supply of packages to said package wrapping machine.

9. In apparatus for supplying individual wrappers to a package wrapping machine, mechanism for applying a tear tape to the wrapping material transversely thereof and projecting beyond at least one side thereof, said tape-applying mechanism comprising a bed, a stationary knife overlying said bed in transverse parallel relation thereto, means for advancing short lengths of tear tape material across said knife into overlying relationship with said bed, a second knife movable between upper and lower limit positions to engage said stationary knife and sever said short lengths of tear tape material, said movable knife having a flat undersurface to engage said short lengths of tear tape material, said flat undersurface in the lower limit position of said knife disposed coplanar with the upper surface of said bed, a heater element mounted below said bed for displacement normal to said bed between upper and lower limit positions in vertical alignment with said movable knife, said heater in its upper limit position being coplanar with the upper surface of said bed to engage against said movable knife in its lower limit position, and driving means for said movable knife and said heater element to simultaneously displace said movable knife to its lower limit position and said heater element to its upper limit position.

10. In apparatus for supplying individual wrappers to a package wrapping machine, mechanism for applying a tear tape to the wrapping material transversely thereof and projecting beyond at least one side thereof, said tape-applying mechanism comprising a bed, a stationary knife overlying said bed in transverse parallel relation thereto, means for advancing short lengths of tear tape material across said knife into overlying relationship with said bed, a second knife movable between upper and lower limit positions to engage said stationary knife and sever said short lengths of tear tape material, said movable knife having a flat undersurface to engage said short lengths of tear tape material, said flat undersurface in the lower limit position of said knife disposed coplanar with the upper surface of said bed, a rocker arm pivotally mounted on said bed about an axis parallel to said first knife, a heater element mounted on one end of said arm below said bed for displacement normal to said bed between upper and lower limit positions in vertical alignment with said movable knife, said heater in its upper limit position being coplanar with the upper surface of said bed to engage against said movable knife in its lower limit position, and driving means for said movable knife and said rocker arm to simultaneously displace said movable knife to its lower limit position and said heater element to its upper limit position.

11. In apparatus for supplying individual wrappers to a package wrapping machine, mechanism for applying a tear tape to the wrapping material transversely thereof and projecting beyond at least one side thereof, said tape-applying mechanism comprising a bed, a stationary knife overlying said bed in transverse parallel relation thereto, means for advancing short lengths of tear tape material across said knife into overlying relationship with said bed, a second knife movable between upper and lower limit positions to engage said stationary knife and sever said short lengths of tear tape material, said movable knife having a flat undersurface to engage said short lengths of tear tape material, said flat undersurface in the lower limit position of said knife disposed coplanar with the upper surface of said bed, a rocker arm pivotally mounted on said bed about an axis parallel to said first knife, a heater element mounted on one end of said arm below said bed for displacement normal to said bed between upper and lower limit positions in vertical alignment with said movable knife, said heater in its upper limit position being coplanar with the upper surface of said bed to engage against said movable knife in its lower limit position, a solvent applicator mounted on the other end of said arm above said bed for vertical displacement between upper and lower limit positions, in the lower limit position said applicator being disposed coplanar with said bed, and driving means for said movable knife and said rocker arm to simultaneously displace said movable knife to its lower limit position, said heater element to its upper limit position, and said applicator to its lower limit position.

12. In apparatus for supplying individual wrappers to a package wrapping machine, mechanism for applying a tear tape to the wrapping material transversely thereof and projecting beyond at least one side thereof, said tape-applying mechanism comprising a bed, a stationary knife overlying said bed in transverse parallel relation thereto, means for advancing short lengths of tear tape material across said knife into overlying relationship with said bed, a second knife movable between upper and lower limit positions to engage said stationary knife and sever said short lengths of tear tape material, said movable knife having a flat undersurface to engage said short lengths of tear tape material, said flat undersurface in the lower limit position of said knife disposed coplanar with the upper surface of said bed, a rocker arm pivotally mounted on said bed about an axis parallel to said first knife, a heater element mounted on one end of said arm below said bed for displacement normal to said bed between upper and lower limit positions in vertical alignment with said movable knife, said heater in its upper limit position being coplanar with the upper surface of said bed to engage against said movable knife in its lower limit position, a solvent supply, a solvent applicator mounted on the other end of said arm above said bed for vertical displacement between upper and lower limit positions, in the lower limit position said applicator being disposed coplanar with said bed, and in the upper limit position said applicator engaging said solvent supply, the distance along said bed intermediate said applicator and said heater element, being equal to the length of an individual wrapper, and driving means for said movable knife and said rocker arm to simultaneously displace said movable knife to its lower limit position, said heater element to its upper limit position, and said applicator to its lower limit position.

No references cited.